United States Patent [19]

Udden et al.

[11] 3,953,054

[45] Apr. 27, 1976

[54] HAND OPERATED WHEEL-CHAIR

[75] Inventors: Per Udden, Timra; Siegfrid Graf, Fagervik; Bert Engman, Sorberge, all of Sweden

[73] Assignee: Permobilstiftelsen, Timra, Sweden

[22] Filed: Mar. 18, 1974

[21] Appl. No.: 452,147

[30] Foreign Application Priority Data
Mar. 19, 1973 Sweden.............................. 7303826

[52] U.S. Cl. ........................ 280/242 WC; 297/347; 297/DIG. 4
[51] Int. Cl.² .......................................... A61G 5/00
[58] Field of Search ...... 280/242 WC, 5.2, DIG. 10; 180/29; 297/DIG. 4, 347

[56] References Cited
UNITED STATES PATENTS

| | | | |
|---|---|---|---|
| 865,514 | 9/1907 | Mullenmeister | 280/DIG. 10 |
| 1,591,529 | 7/1926 | Gueber | 297/DIG. 4 |
| 1,739,260 | 12/1929 | Roe | 280/5.2 |
| 2,224,411 | 12/1940 | Smith | 180/29 |
| 2,859,799 | 11/1958 | Moore | 297/DIG. 4 |
| 2,915,112 | 12/1959 | Schwartz | 297/347 X |

*Primary Examiner*—Kenneth H. Betts
*Assistant Examiner*—R. Schrecengost
*Attorney, Agent, or Firm*—Walter Becker

[57] ABSTRACT

A hand operated wheel-chair with a pair of main wheels rigidly connected with the frame-work of the chair, at least one of which is either motor or hand operated and at least one castor wheel being pivotally connected with the frame-work of the chair and at least one support wheel being rigidly connected with the frame-work. At least one castor wheel and support wheel are positioned on each side of a line extending between the support points of the main wheels and at a level above the ground surface to permit either the castor or the support wheels to be in contact with the ground surface depending on whether the vertical through the center of gravity is located on one or the other side of said line between the support points of the main wheels. The wheel-chair also comprises a seat, which is disposed substantially mid-way between the main wheels and is supported by a transverse portion of the frame-work extending between the main wheels and being provided with a seat support in the form of a central column, which includes spring members for the seat and means for adjusting the height of the seat.

7 Claims, 2 Drawing Figures

HAND OPERATED WHEEL-CHAIR

The present invention relates to a hand operated wheel-chair, comprising a pair of main wheels, which are rigidly connected with the chassis of the chair and at least one of which serves as driving wheel, at least one front, or rear castor wheel, which is pivotably connected with the chassis of the chair.

Hand operated wheel-chairs of previously known design with a pair of castor wheels mounted either in front of or behind the main wheels suffer from great drawbacks. Thus, the design usually is substantially broader than the width of the occupant, since the width of the main wheels together with their driving rings is added to the width of the occupant, which makes the chair difficult to handle in narrow passages. Conventional hand operated wheel-chairs are provided with side panels, which can be folded together. The seat comfort in such chairs is extremely bad because the seat lacks any kind of spring system. Further, there is no possibility of adjusting the seat height. The footplate must of course be disposed above the floor and at a level which causes the height of the seat to be substantially higher than that in a normal chair. This makes it difficult, and in many cases impossible, for a seriously handicapped person to pick up things from the floor.

For comfortable sitting the seat should be inclined backwards, and when the occupant wants to take a working position it should be horizontal. Moreover, the thighs should be supported throughout their entire length. In conventional wheel-chairs, the seat inclination can be varied only with difficulty and the occupant must first be lifted out of the chair before the inclination can be adjusted. Conventional wheel-chairs cannot be conveniently used for toilet visits, either because of the toilet doors being too narrow to allow the chair to pass, or the space in the toilet and bath-rooms being too small to enable handling of the wheel-chair. In addition, a conventional wheel-chair seat cannot be moved above a toilet seat.

When an invalid is to raise from a wheel-chair the seat depth should be as small as possible and the seat should be at high level to facilitate the leaving of the chair. In addition, it should be possible for the occupant to place his feet on the floor so that he can avoid to have them on the foot rest.

An invalid working at a bench, for instance in a kitchen, usually must be able to move sideways rather than forwards and backwards, which is the only possibility with conventional wheel-chairs.

For some invalids it is difficult to steer the chair on straight course, particularly if the main part of the weight is resting on the big driving wheels and a minor part is supported by the small pivotable castor wheels. On the other hand with regard to friction the weight carried by the castors should be as small as possible. If a major part of the weight is carried by the castors the steering function will be heavy and dull.

In many occasions, for instance when working at an office desk, it is convenient to be able to turn an angle of 90°, which is the normal requirement on a conventional office chair. For many invalids particularly young people, the conventional wheel-chair does not permit intimate intercourse since they cannot come close to each other and cannot caress and fondle in a normal way and they cannot dance with normal body contact either. Also in other respects the big driving wheels will prevent or complicate movements, e.g. from the chair to the bed.

All the above-mentioned drawbacks of conventional wheel-chairs are eliminated and the desired functions are realized in a wheel-chair according to the present invention, as defined in the appended claims.

Some embodiments of the wheel-chair according to the invention will now be described more in detail with reference to the accompanying drawing, in which.

Figure 1:
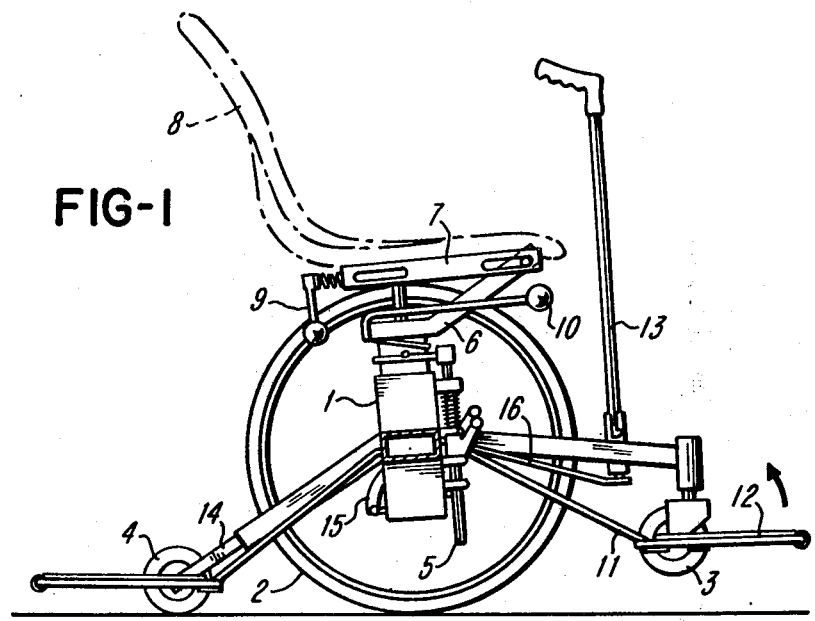
FIG. 1 is a side view of the wheel-chair according to the invention.
Figure 2:
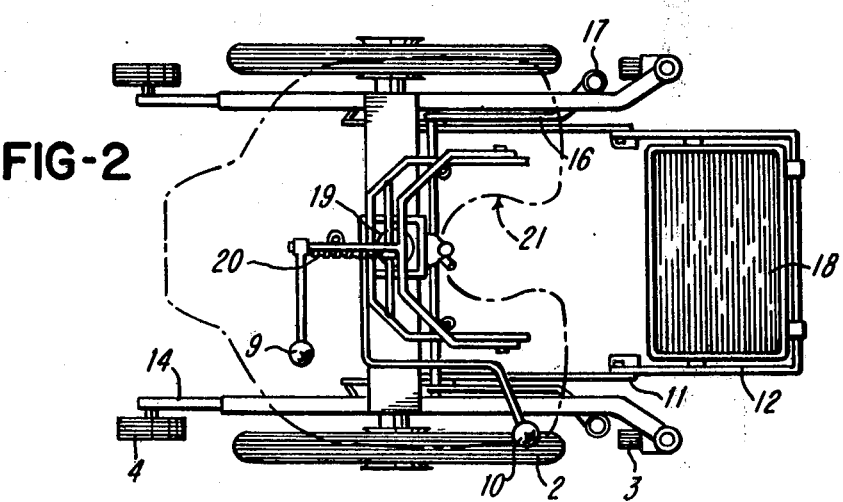
FIG. 2 is a plan view of the chair of FIG. 1.

As disclosed in the drawings, the seat 8 is disposed substantially midway between two main wheels 2 and is supported by a chassis comprising a central column 1 with spring means, and height adjusting means 5 in the form of a jack. The chassis is further provided with two forward and two rearward projecting levers carrying at their ends a pair of support wheels 4 and a pair of castor wheels 3, respectively, whereby the frame will be substantially H-shaped as seen in the horizontal view. In the embodiment disclosed, the two supporting wheels 4 are disposed behind the seat and are mounted on extension tubular members 14 with which they are non-rotatably connected, whereas the two castors 3 are being disposed in front of the main wheels. The axial distances between the main wheels 2, the support wheels 4 and the castor wheels 3 are substantially equal and should not exceed the maximum width of the seat. This will render good steering function and maneuverability to the chair even in narrow spaces. The chassis is thus designed according to the invention, that either the castor wheels 3 or the support wheels 4 will be in touch with a plane ground support, depending on whether the vertical through the center of gravity of the chair will lie on one or the other side of an axis through the main wheel centers. This will automatically result in different inclinations of the seat, depending on how the occupant changes the position of the center of gravity of the chair. In the embodiment disclosed the seat is provided with a tube assembly 19 which is telescopically displaceable in the central column 1, and the seat is also rotatable about an axis which intersects the axis between the driving wheels, whereby the position of the center of gravity will remain substantially unchanged when the seat is turned independent of if the wheel-chair is resting on the castor wheels or the support wheels. The object of this arrangement is that the occupant when leaning forwards will move the center of gravity so that the chair will tilt forwards and be supported by the castors 3 and the seat 8 will take a substantially horizontal position in which, inter alia, the chair is easy to steer. When the occupant leans backwards, the chair will tilt backwards and be supported by the fixed support wheels 4, and the seat 8 will then take a backwards inclined position, in which the chair can easily be moved straight ahead without any steering correction, since the support wheels will effect course stabilization. The effect of the movement of the center of gravity will be increased by a spring suspension permitting the seat to rotate against the spring action around a horizontal axis between the hocks and a vertical projection of the crutch of the occupant. When the occupant leans forwards the pressure acting on the spring suspension will be reduced thereby causing this spring to expand and the chair will be tilted forwards on the front castors, which results in a horizontal seat. When the occupant leans backwards the spring will be compressed, which together with the backwards tilting to the rear support wheels results in a comfortable seat position. The occupant can choose the desired direction of movement of the chair, with the castor wheels in a leading or trailing position.

It has been found that a wheel chair according to the invention can be easily moved indoors if the occupant uses his hands for pulling or pushing himself ahead. As a matter of fact, in the embodiment disclosed where the distance between the wheel centers is less than the maximum seat width, it is possible to come sufficiently close to objects to give the occupant a wide radius of action and a good angle of operation. Merely in exceptional cases, the occupant will have to use the drive rings with which the main wheels could be equipped. A pre-requisite is, however, that the seat is designed to enable the person to readily move his overarms backwards, which means that the seat and the back-rest must be narrow above the elbow level. Such a design will also permit the chair to be moved along a corridor, while pushing it forwards with the hands on the walls.

For hemiplegia patients and others, a wheel-chair according to the invention with one single large driving wheel is of considerable advantage. Hemiplegia patients usually have great difficulties in steering a wheelchair straight ahead. Thus, as mentioned above, the occupant can lean backwards so that the chair rests on its fixed support rear wheels, whereby the chair can be driven on straight course by using only one hand. If the occupant wants to change driving direction he leans forwards so that the chair comes to rest on the front castor wheels and the direction of movement is changed for the desired course.

As indicated above in designing the wheel-chair according to the invention, much effort has been expended on the design of the seat in order to accomplish good comfort and mobility for the invalid. Therefore, to facilitate raising from the seat to the feet, the chair is equipped with an arm or hand support 13, which is positioned in the front part of the chair. This support, in the embodiment disclosed, comprises detachably mounted bars which are insertable into support members 17 which are connected with elements 15 affecting the brakes of the main wheels through a lever 16. Thus, the chair will be automatically braked when the support members are loaded. Said braking elements can either be in the form of drum brakes on the main wheels, whereby the braking action is effected by means of a linkage, which is accessible from both sides of the chair and in which a resilient force actuates the brakes. The braking mechanism comprises an eccentric which in idle position releases the braking spring and in operative position stretches the spring and locks it by taking a stable rest position. By interconnecting the eccentrics of both sides through a shaft, the braking of both wheels can be accomplished selectively with any of the left or right hand braking levers.

Different work places and different situations require different seat height. Obviously, the invalid should be able to reach downwards as far as possible in order to pick up things from the floor or, for instance, to sit in a party drinking coffee at low sofa tables. In other cases, the invalid will have to work at a desk or a high production line, or to reach different shelves in a bookcase. It is less known, however, how important it is for the invalid to be able to elevate the seat in order to facilitate his leaving of the chair. Therefore, the possibility of raising and lowering the seat, by means of a jack 5, for example, must be considered as a very important stage for adapting the invalid to different situations in life. The jack 5 can be provided with a fork adapted to raise and lower the seat. In addition to this adjustability in height, the seat, according to the invention, is displaceable in a seat frame 7 with sliding tracks. Hereby a satisfactory working position can be attained, since the seat can be moved beneath a table or the like. The seat can be locked in any desired position by a latch mechanism operable by a handle 9. The movement back and forth may be effected, for instance, by means of a threaded feed screw 20.

In order to facilitate raising from the wheel chair, the seat can be formed with a wide recess 21, which makes it possible for the occupant to move one leg backwards under his body and the other leg correspondingly on the outer side of the seat. When the occupant has lifted himself with his arms, both legs can take an overextended position. The recess 21 is normally covered by a lid, which can be easily removed for facilitating toilet visits or petting. The seat cover is thus designed that a large piece thereof can be folded aside e.g. to avoid soiling with sprinkles of urine. The seat can suitably be made of glass fiber, which can be easily kept clean.

The wheel-chair according to the invention is further provided with a foot rest 18 which is pivotally mounted in a frame 12 which, in its turn, is pivotally connected with resilient supporting members 11 connected to the chassis. It is of particular importance in the design of the wheel-chair according to the invention with two seat inclinations, viz. one horizontal position and one backwards inclined position that in the horizontal position the foot rest is positioned just above the ground surface. The support members are suitably made of spring steel in order to provide a foot rest which can spring towards the ground when loaded. This arrangement will essentially facilitate the taking and leaving of the chair, since the foot plate will not hinder but serve as support for the invalid. In other situations, for instance at toilet visits or at a work place it is often desirable to remove the foot plate and therefore it is pivotally mounted between the support members 11 in order to be swung away inwardly towards the center column of the chassis. In one embodiment according to the invention the foot plate is positioned on the same end of the chair as the fixed support wheels, which makes it possible to choose a substantially larger and wider foot plate since the swinging movement of the castor wheels affects the maximum width of the foot plate.

The wheel-chair according to the invention can be given numerous different designs within the scope of the claims. Thus, the main wheels can either be of normal size, or sufficiently small to be disposed beneath the seat. As mentioned above in other designs a small wheel can be disposed on one side of the chair beneath the seat, and a large wheel, reaching above the seat on the other side. The seat frame can suitably be made of square profiles with locking positions straight ahead and at 90° rotation to each side. The locking can suitably occur automatically when the seat is lifted up a few millimeters, and a female member in the profile is rotated together with the seat, and the locking operation occurs in desired position by engagement with a male member. The seat can be lifted by means of a simple lever mechanism having an operating handle arrangement which is accessible from both sides of the seat, suitably with one handle at each side. The seat may also be spring loaded around a shaft disposed as near the front edge of the seat as possible. By mounting the spring in a central position, the same spring action can be obtained irrespective of the angular direction of the seat. The castor wheels should preferably have a diameter of at least 5 cms., suitably 7 or 10 cms, and the fixed support wheels may be of substantially the same size. As mentioned, the support wheels, too, can be designed as castor wheels in same embodiments.

We claim:

1. A hand-operated wheel-chair comprising in combination:
   a pair of main wheels which are rigidly connected with the frame of the chair and at least one of which serves as driving wheel,
   a pair of castor wheels which are pivotally connected with the frame of the chair, the seat of the said chair being disposed substantially halfway between the main wheels to locate the vertical through the center of gravity of the chair, by small positional changes of the seat for a person to sit thereon, ahead of as well as behind a line extending between the support points of the main wheels, when the chair is standing on a flat and horizontal ground surface,
   a pair of support wheels being substantially non-pivotally connected with the frame, whereby said castor wheels and support wheels are being positioned at a level above said ground surface to permit either the castor or the support wheels to be in contact with the ground surface when said vertical through the center of gravity is located on one or the other side of the line extending between the support points of the main wheels, the frame comprising
   a transverse portion, extending between the main wheels and being provided with a seat support in the form of a central column, which includes therewith position adjusting means for the seat, the inner distance between the main wheels not exceeding the maximum width of the seat.

2. A wheel-chair according to claim 1, wherein at least one support wheel is non-pivotally connected with the frame of the chair.

3. A wheel-chair according to claim 1, wherein at least one support wheel is a castor wheel.

4. A wheel-chair according to claim 1, wherein two support wheels and two castor wheels are disposed in pairs with substantially the same center distance as the main wheels.

5. A wheel-chair according to claim 1, wherein the transverse portion of the frame is provided with two forwardly and two rearwardly directed support arms, adapted to carry the supporting wheels and the castor wheels, respectively, at their ends, whereby the frame in horizontal projection has H-shaped configuration.

6. A wheel-chair according to claim 1, wherein the frame is provided with support means for detachable arm or hand-rests.

7. A wheel-chair according to claim 1, wherein the frame is provided with means for carrying at least one foot plate.

* * * * *

UNITED STATES PATENT OFFICE
CERTIFICATE OF CORRECTION

Patent No. 3,953,054          Dated April 27, 1976

Inventor(s) Per Udden et al.

It is certified that error appears in the above-identified patent and that said Letters Patent are hereby corrected as shown below:

On the cover sheet in item [73],

"Assignee: Permobilstiftelsen, Timra, Sweden"

should read

-- Assignee: Stiftelsen Teknisk Hjälp
             At Handikappade, Permobilstiftelsen,
             Timra, Sweden --.

Signed and Sealed this

Fifteenth Day of March 1977

[SEAL]

Attest:

RUTH C. MASON
Attesting Officer

C. MARSHALL DANN
Commissioner of Patents and Trademarks